United States Patent
Mueller

(10) Patent No.: US 10,878,383 B2
(45) Date of Patent: *Dec. 29, 2020

(54) SYSTEMS AND METHODS FOR RELATIONSHIP MANAGEMENT

(71) Applicant: Leasehawk, LLC, Scottsdale, AZ (US)

(72) Inventor: Michael E. Mueller, Scottsdale, AZ (US)

(73) Assignee: LEASEHAWK, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/828,153

(22) Filed: Mar. 24, 2020

(65) Prior Publication Data

US 2020/0226555 A1 Jul. 16, 2020

Related U.S. Application Data

(63) Continuation of application No. 16/103,783, filed on Aug. 14, 2018, now Pat. No. 10,636,016, which is a
(Continued)

(51) Int. Cl.
*G06Q 10/10* (2012.01)
*H04W 4/12* (2009.01)
(Continued)

(52) U.S. Cl.
CPC . *G06Q 10/1097* (2013.01); *G06Q 10/063114* (2013.01); *G06Q 10/109* (2013.01); *H04W 4/12* (2013.01); *H04L 67/22* (2013.01)

(58) Field of Classification Search
None
See application file for complete search history.

(56) References Cited

U.S. PATENT DOCUMENTS

| 10,127,527 B1 | 11/2018 | Mueller | |
| 2004/0185883 A1* | 9/2004 | Rukman | H04W 4/12 455/466 |

(Continued)

OTHER PUBLICATIONS

Lifehacker.com, "Burner Generates Disposable Phone Numbers for Perfectly Private Calls and Text Messages," https://lifehacker.com/5933208/burner-generates-disposable-phone-numbers-for-perfectly-private-calls-and-text-messages, Aug. 2012. (Year: 2012).*

(Continued)

*Primary Examiner* — Mehmet Yesildag
(74) *Attorney, Agent, or Firm* — Snell & Wilmer L.L.P.

(57) ABSTRACT

A relationship management system and method are configured to enable a user to manage a relationship with their contacts from the initial interaction through the life cycle of a transaction or relationship and beyond. For example, a relationship management system may record and sort all communications (for example, phone calls, text messages, and emails) into a contact's profile, empowering a user to easily see the entire relationship at a glance. Moreover, using actionable business intelligence, an exemplary relationship management system may utilize a workflow engine to send notifications, schedule tasks, and allow users to see reports, thus allowing a user to increase productivity and save time. Exemplary relationship management systems are configured for use in the multi-family housing industry.

20 Claims, 22 Drawing Sheets

Related U.S. Application Data continuation of application No. 15/084,989, filed on Mar. 30, 2016, now Pat. No. 10,127,527, which is a continuation of application No. 14/740,562, filed on Jun. 16, 2015, now abandoned.

(60) Provisional application No. 62/012,809, filed on Jun. 16, 2014.

(51) Int. Cl.
  *G06Q 10/06* (2012.01)
  *H04L 29/08* (2006.01)

(56) References Cited

U.S. PATENT DOCUMENTS

| | | | | |
|---|---|---|---|---|
| 2011/0053574 A1* | 3/2011 | Rice | ............... | H04M 1/72597 |
| | | | | 455/418 |
| 2012/0089550 A1* | 4/2012 | Arora | ............... | G06Q 10/10 |
| | | | | 706/47 |
| 2012/0252497 A1* | 10/2012 | Altscher | ............... | H04W 4/029 |
| | | | | 455/456.3 |
| 2013/0191481 A1* | 7/2013 | Prevost | ............... | H04L 51/14 |
| | | | | 709/206 |
| 2019/0147409 A1 | 5/2019 | Mueller | | |

OTHER PUBLICATIONS

Non-Final Office Action dated May 9, 2016 in U.S. Appl. No. 14/740,562.
Final Office Action dated Jan. 18, 2017 in U.S. Appl. No. 14/740,562.
Non-Final Office Action dated May 9, 2016 in U.S. Appl. No. 15/084,989.
Final Office Action dated Jan. 12, 2017 in U.S. Appl. No. 15/084,989.
Advisory Action dated May 8, 2017 in U.S. Appl. No. 15/084,989.
Non-Final Office Action dated Jul. 3, 2017 in U.S. Appl. No. 15/084,989.
Non-Final Office Action dated Jan. 25, 2018 in U.S. Appl. No. 15/084,989.
Notice of Allowance dated Jun. 5, 2018 in U.S. Appl. No. 15/084,989.
Notice of Allowance dated Mar. 3, 2020 in U.S. Appl. No. 16/103,783.
Lifehacker.com, "Burner Generates Disposable Phone Numbers for Perfectly Private Calls and Text Messages," https://lifehacker.com/5933208/burner-generates-disposable-phone-numbers-for-perfectly-private-calls-and-text-messages, Aug. 2012.

* cited by examiner

Canada Only Test Customer
Home Sweet Home
LeaseFerret
LeaseHawk Checklist
Lena's Apartments
NOC Test
The Green Grounds
Tracie Apartments

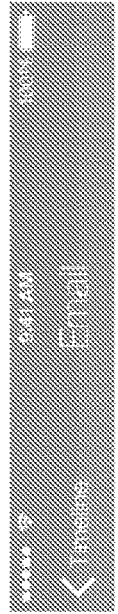

March 1, 2015 at 12:05 PM

From: ksmith@gmail.com
To: muellermanor@properties.com

Subject: 1 Bedroom Apartment

Hi – I'm interested in a 1 bedroom apartment but I have 2 dogs.

Do you have anything available around March 13th?

Thanks!

FIG. 5E

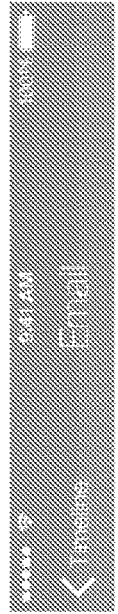

March 1, 2015 at 12:10 PM

From: muellermanor@properties.com
To: ksmith@gmail.com

Subject: Re: 1 Bedroom Apartment

Thank you for your interest in Mueller Manor. We do have beautiful one bedrooms available on March 13th and we do allow pets up to 25 pounds each with a $125 pet deposit, per pet.

Can I schedule an appointment for you to come in and view our property?

Thank you.

FIG. 5F

Show Unit 513

Status: Active

Start Date: 3/10/2015 at 3:00 PM

End Date: 3/10/2015 at 3:30 PM

Reminder: 15 Minutes Before

Assigned To: Donald Caubie

Site Customer: Kameron Smith

Notes

FIG. 5L march 2015

Tour Property
9:00 AM - 9:30 AM    Assigned to Donald Caubie

Sign Lease
11:00 AM - 12:00 PM    Assigned to Donald Caubie

Show Unit 115
2:00 PM - 2:30 PM    Assigned to Donald Caubie

Show Unit 513
3:00 - 3:30 PM

FIG. 5K

SYSTEMS AND METHODS FOR RELATIONSHIP MANAGEMENT

CROSS-REFERENCE TO RELATED APPLICATION

This application is a continuation of, claims priority to and the benefit of, U.S. patent application Ser. No. 16/103,783, filed on Aug. 14, 2018 and entitled "SYSTEMS AND METHODS FOR RELATIONSHIP MANAGEMENT," which is a continuation of U.S. patent application Ser. No. 15/084,989, filed on Mar. 30, 2016 and entitled "SYSTEMS AND METHODS FOR RELATIONSHIP MANAGEMENT (now U.S. Pat. No. 10,127,527 issued on Nov. 13, 2018)," which is a continuation of, claims priority to and the benefit of, U.S. patent application Ser. No. 14/740,562, filed on Jun. 16, 2015 and entitled "SYSTEMS AND METHODS FOR RELATIONSHIP MANAGEMENT," which claims priority to and the benefit of Provisional Application No. 62/012,809, filed on Jun. 16, 2014 and entitled "SYSTEMS AND METHODS FOR RELATIONSHIP MANAGEMENT," which are hereby incorporated by reference in their entirety for all purposes.

TECHNICAL FIELD

The present disclosure generally relates to mobile applications, and more particularly, to methods and systems for the management and organization of communications information received from multiple sources using multiple methods of communication.

BACKGROUND

In today's world, there are countless communication methods available to send communications. Accordingly, everyone is constantly receiving communications from multiple sources, whether it is from a mobile phone text message, email, voicemail, social media message, etc. This overload of information may cause confusion and miscommunication as communications are misplaced or forgotten.

Some forms of communication are easily consolidated, such as calendars and emails sharing data between mobile phones and computers. However, there may still be communications from other people or different sources that get lost in the mix. Accordingly, there is a shortfall in communication organization because there is no method for organizing all data received through various communication types with others from all sources.

SUMMARY

In accordance with principles of the present disclosure, a relationship management system and method are configured to enable a user to manage a relationship with their contacts from the initial interaction through the life cycle of a transaction or relationship and beyond. For example, a relationship management system may record and sort all communications into a contact's profile, empowering a user to easily see the entire relationship at a glance. Moreover, using actionable business intelligence, an exemplary relationship management system may utilize a workflow engine to send notifications, schedule tasks, and allow users to see reports, thus allowing a user to increase productivity and save time.

In accordance with an exemplary embodiment, a relationship management system comprises a user interface operable on a mobile device; a server in communication with the user interface, the server configured to implement business processes associated with communication information received by the relationship management system; and a database in communication with the server, the database configured to store the communication information received at the relationship management system. The relationship management system is configured to manage multiple forms of communication information associated with a contact of a user using actionable business intelligence to provide a workflow engine to send notifications, schedule tasks, and allow users to see reports, thus allowing a user to increase productivity and save time.

In another exemplary embodiment, a computerized method for relationship management comprises receiving, at a relationship management system, an item of communication from a user; filtering, by a relationship management engine in the relationship management system, the item of communication into at least one of a plurality of buckets; analyzing, by a workflow engine in the relationship management system, the item of communication to identify at least one of a plurality of actions to take in response to the item of communication; and implementing, via a mobile software application of the relationship management system, the at least one of the plurality of actions responsive to the item of communication.

The contents of this section are intended as a simplified introduction to the disclosure, and are not intended to limit the scope of any claim.

BRIEF DESCRIPTION OF THE DRAWINGS

With reference to the following description, appended claims, and accompanying figures, in which like reference numbers refer to like elements or acts throughout the figures:

DETAILED DESCRIPTION

Figure 1:
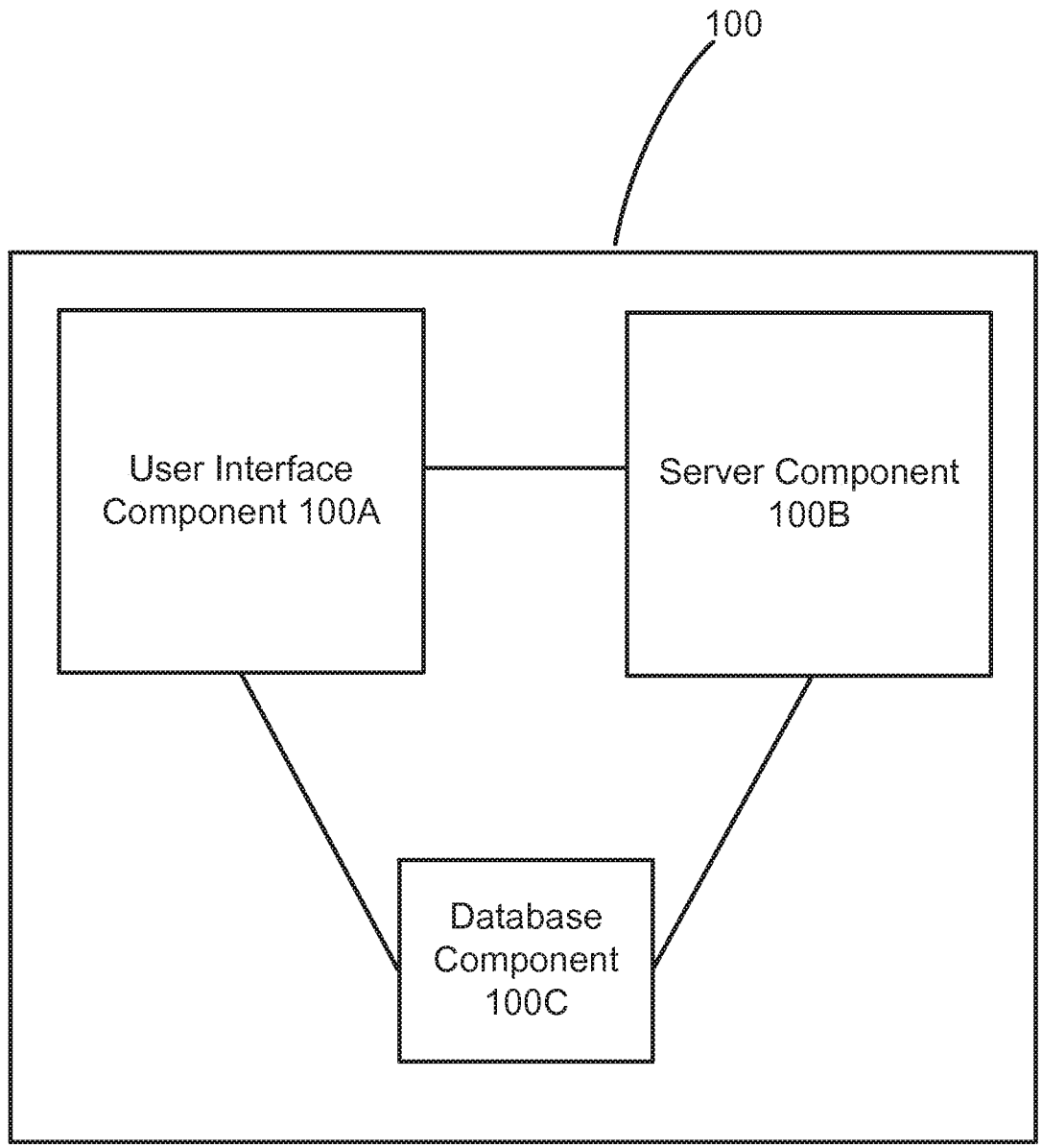
FIG. 1 is a block diagram of an exemplary relationship management system in accordance with an exemplary embodiment.

The following description is of various embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure or appended claims.

It should be appreciated that exemplary components and steps may be realized by any number of hardware, software, or other components configured to perform the specified functions. For example, an exemplary embodiment employs various graphical user interfaces, software components, and networking and/or database functionality. In addition, various embodiments may be practiced in any number of communications management and/or information management contexts, and the embodiments disclosed are merely indicative of exemplary applications. For example, the principles, features and methods discussed may be applied to various industries, and are not limited to use in connection with communications information. Moreover, various exemplary embodiments are discussed in connection with management of communications associated with multi-family housing management; however, it will be appreciated that principles of the present disclosure, and exemplary systems and/or methods implementing the same, may suitably be applied in various other industries and/or contexts, for example any sales or service-related profession requiring travel outside of a home office for business-related transactions such as realtors, auto dealers, insurance agents, lawyers, doctors, pest control professionals, pool service professionals, landscapers, plumbers, electricians, contractors, pharmaceutical salesmen, etc.

The detailed description of exemplary embodiments herein makes reference to the accompanying figures, which show embodiments by way of illustration. While these embodiments are described in sufficient detail to enable those skilled in the art to practice the disclosure, it should be understood that other embodiments may be realized and that logical and/or functional changes may be made without departing from the spirit and scope of the disclosure. Thus, the detailed description herein is presented for purposes of illustration only and not of limitation. For example, the steps recited in any of the method or process descriptions may be executed in various orders and are not limited to the order presented. Moreover, certain of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "an exemplary embodiment", "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional techniques for data networking, software application development, cloud computing, and/or the like, may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical relationship management system.

Exemplary relationship management systems configured in accordance with principles of the present disclosure enable a user to manage a relationship with their contacts from the initial interaction through the life cycle of a transaction or relationship and beyond. For example, a relationship management system may record and sort all communications into a contact's profile, empowering a user to easily see the entire relationship at a glance. Moreover, using actionable business intelligence, an exemplary relationship management system may utilize a workflow engine to send notifications, schedule tasks, and allow users to see reports, thus allowing a user to increase productivity and save time. It will be appreciated that exemplary relationship management systems and/or methods disclosed herein can enable a user to save time, money, and resources, for example by facilitating management of all business and personal communications in one place.

In an exemplary embodiment, a "relationship management system" may be configured to facilitate organization, storage, and/or display of communications information, for example information sent or received by a management system user. A relationship management system may also take certain actions, for example based on communications types, user settings, and/or the like. With reference now to FIG. 1, in an exemplary embodiment, a relationship management system, for example system 100, may comprise a user interface component 100A, a server component 100B, and a database component 100C. User interface component 100A may be configured to deliver information to and/or receive information from a user. For example, system 100 may be able to send communications of any available form (phone call, email, text message, etc.) via a user's interaction with user interface component 100A. Server component 100B may be configured to interact with user interface component 100A, for example to facilitate system functionality. Database component 100C may be configured for storage and retrieval of information utilized in system 100, and may interact with user interface component 100A and/or server component 100B. It will be appreciated that in various exemplary embodiments, one or more of user interface component 100A, server component 100B, and/or database component 100C may comprise multiple subcomponents, systems, or elements; moreover, a single element or component may offer functionality of (or be considered to be) more than one of user interface component 100A, server component 100B, or database component 100C. For example, in an exemplary embodiment, server component 100B and database component 100C may comprise a single computing and/or communications resource.

In general, relationship management system 100 may comprise any systems, components, and/or modules configured with any suitable methods, algorithms, and/or techniques for communications information management, organization, action, and display. Additionally, system 100 may also suitably interface with any number and/or types of communications, for example, phones, emails, text messages, manual entries, users, aggregation services routers/interactive voice responses, social media websites, etc.

Figure 2:
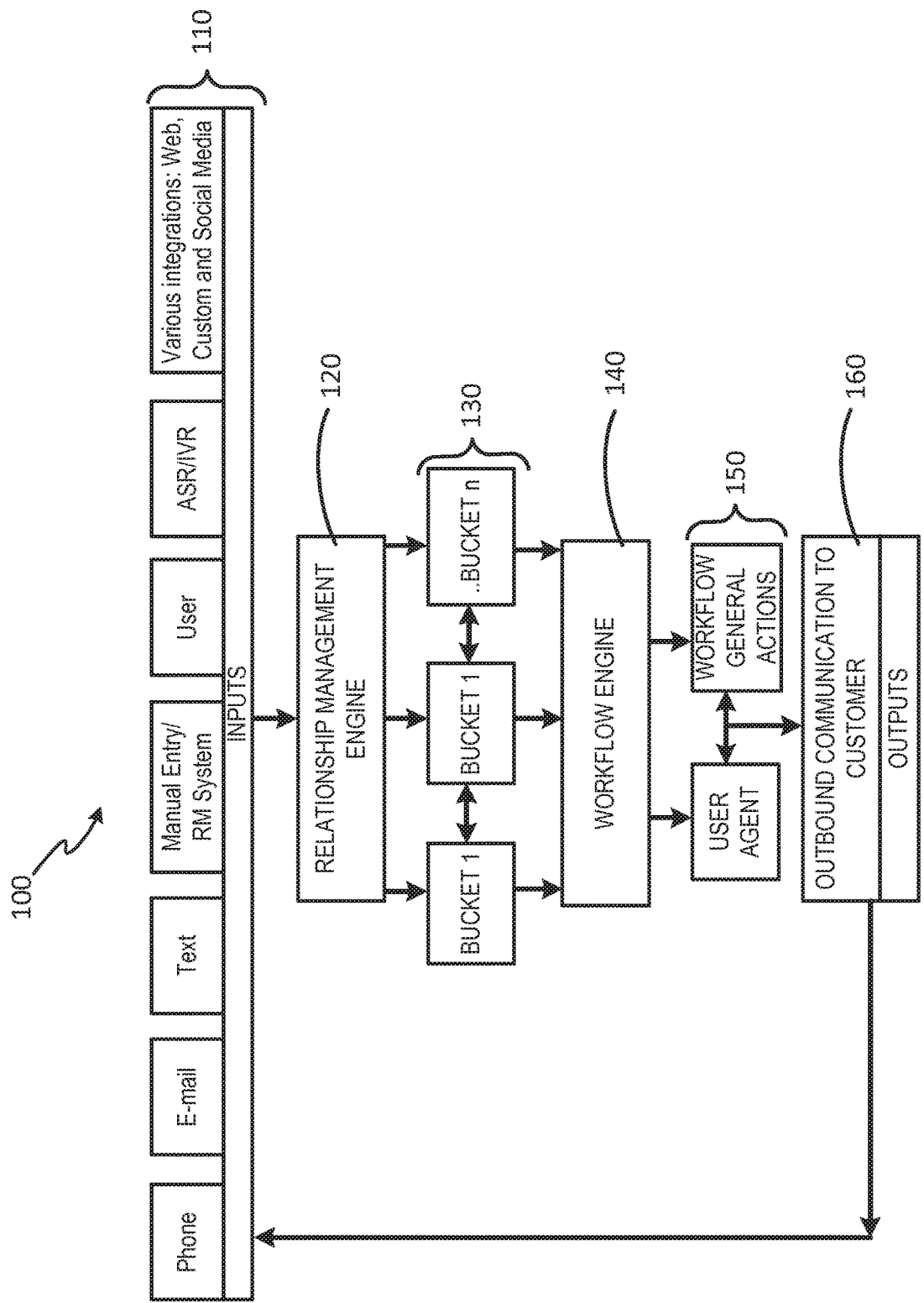
FIG. 2 is a block diagram illustrating exemplary operational characteristics of an exemplary relationship management system in accordance with an exemplary embodiment.
Figure 3A:
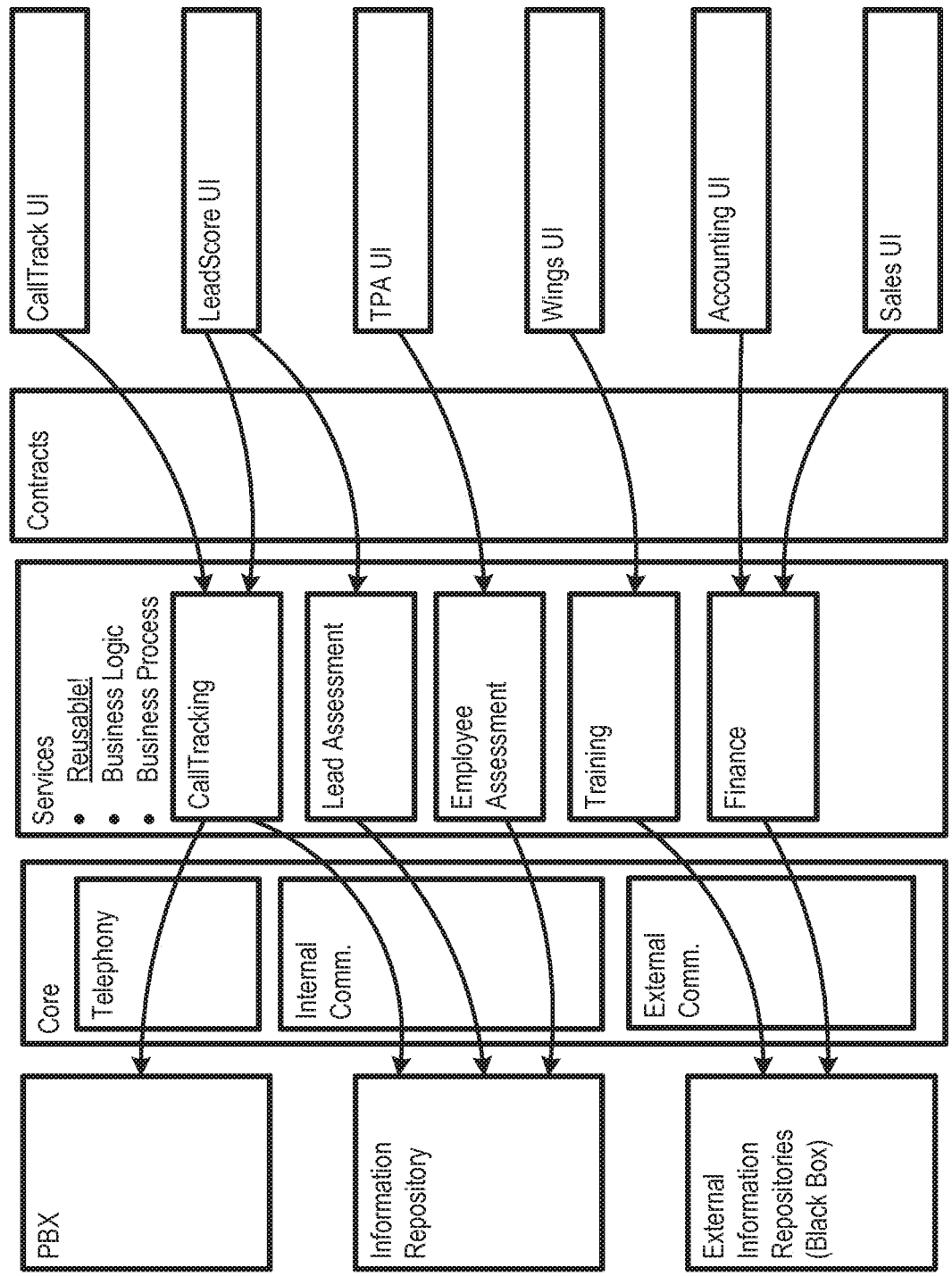
FIG. 3A illustrates exemplary data and process flows in an exemplary relationship management system in accordance with an exemplary embodiment.
Figure 3B:
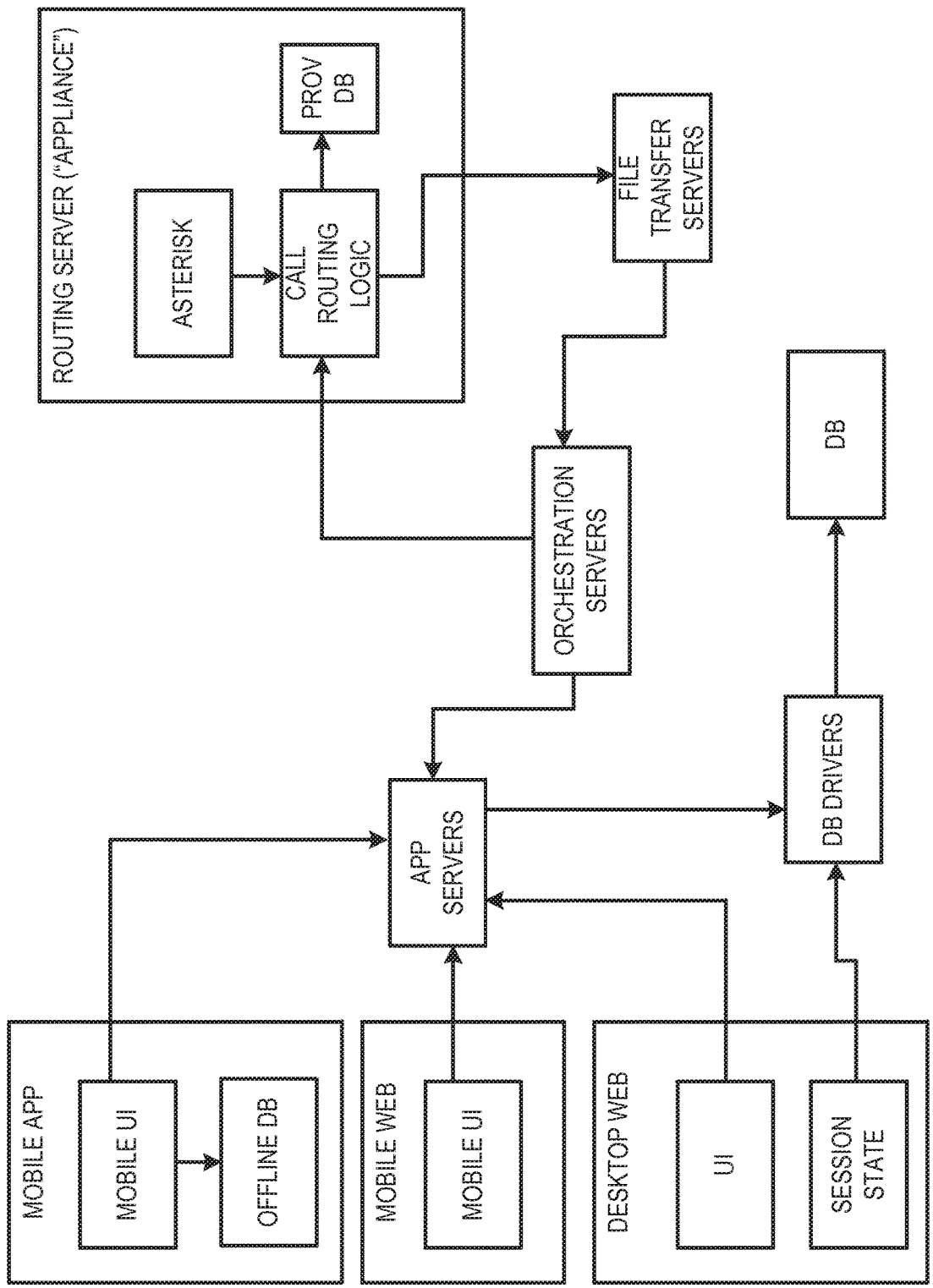
FIG. 3B illustrates exemplary functional components and data/process flows of an exemplary relationship management system in accordance with an exemplary embodiment.
Figure 3C:
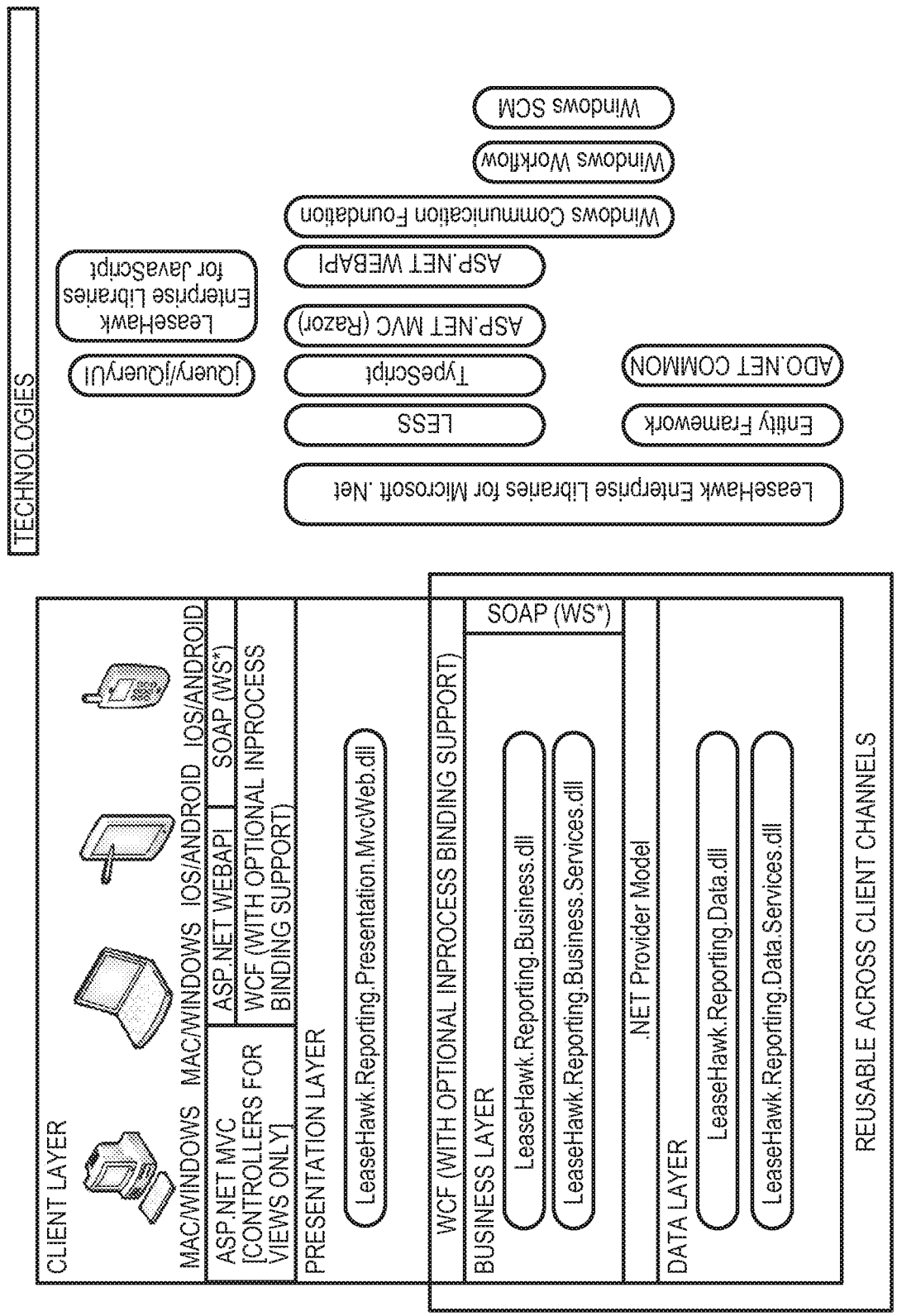
FIG. 3C illustrates an exemplary technology architecture for an exemplary relationship management system in accordance with an exemplary embodiment.
Figure 3D:
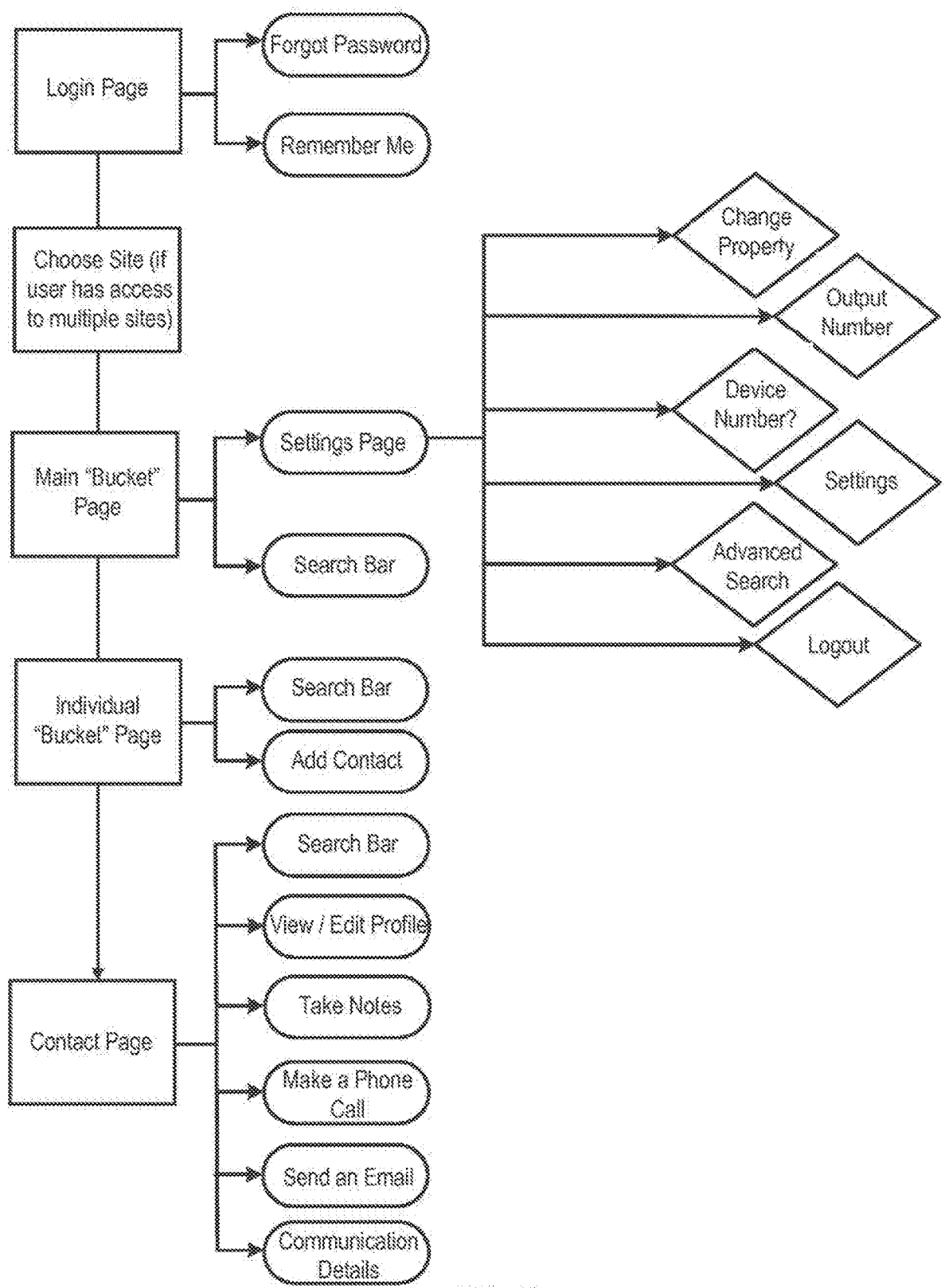
FIG. 3D illustrates an exemplary architecture for a user interface component (mobile application) of an exemplary relationship management system in accordance with an exemplary embodiment.
Figure 3E:
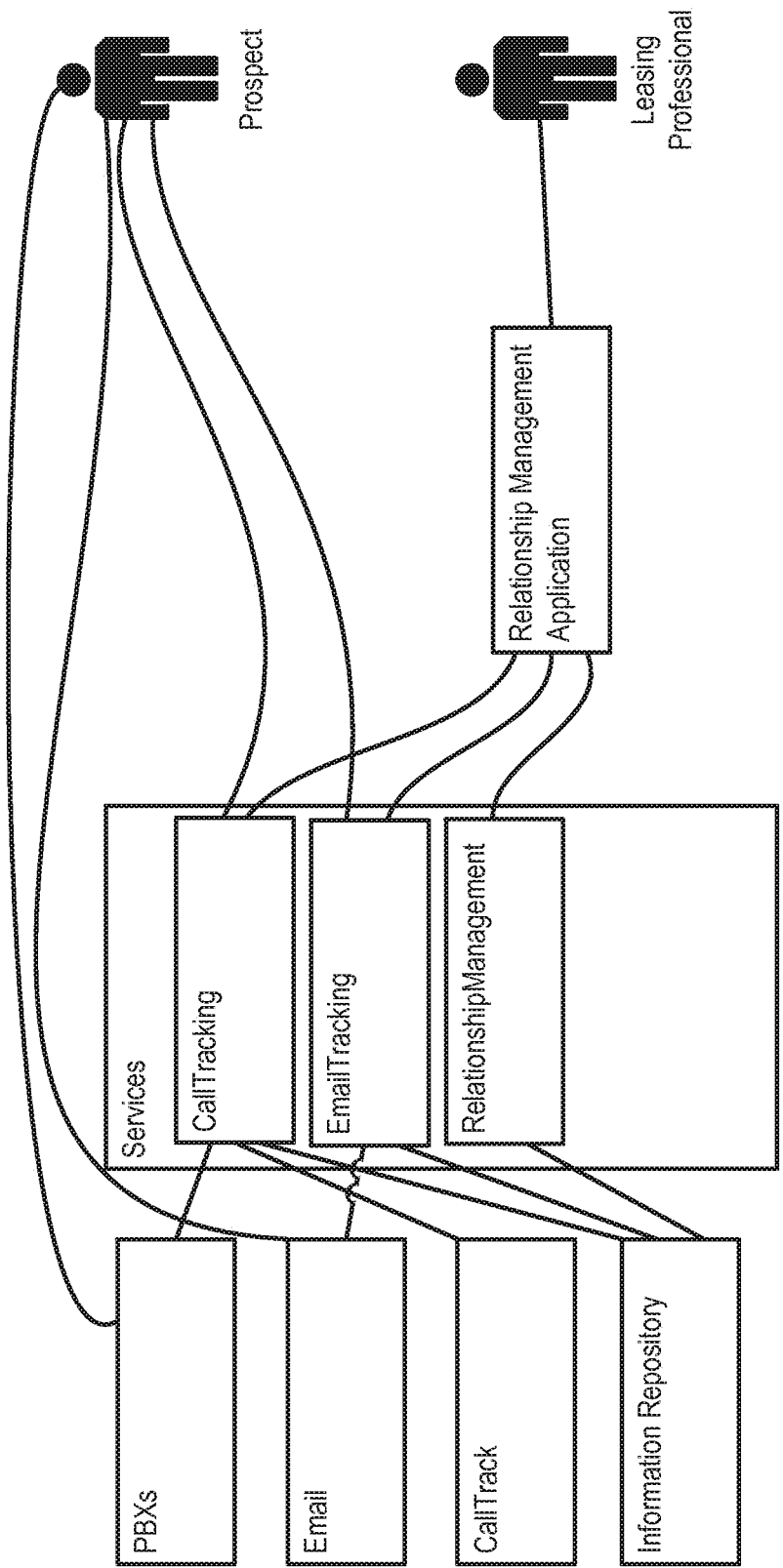
FIG. 3E illustrates data and process flows in an exemplary relationship management system in accordance with an exemplary embodiment.
Figure 3F:
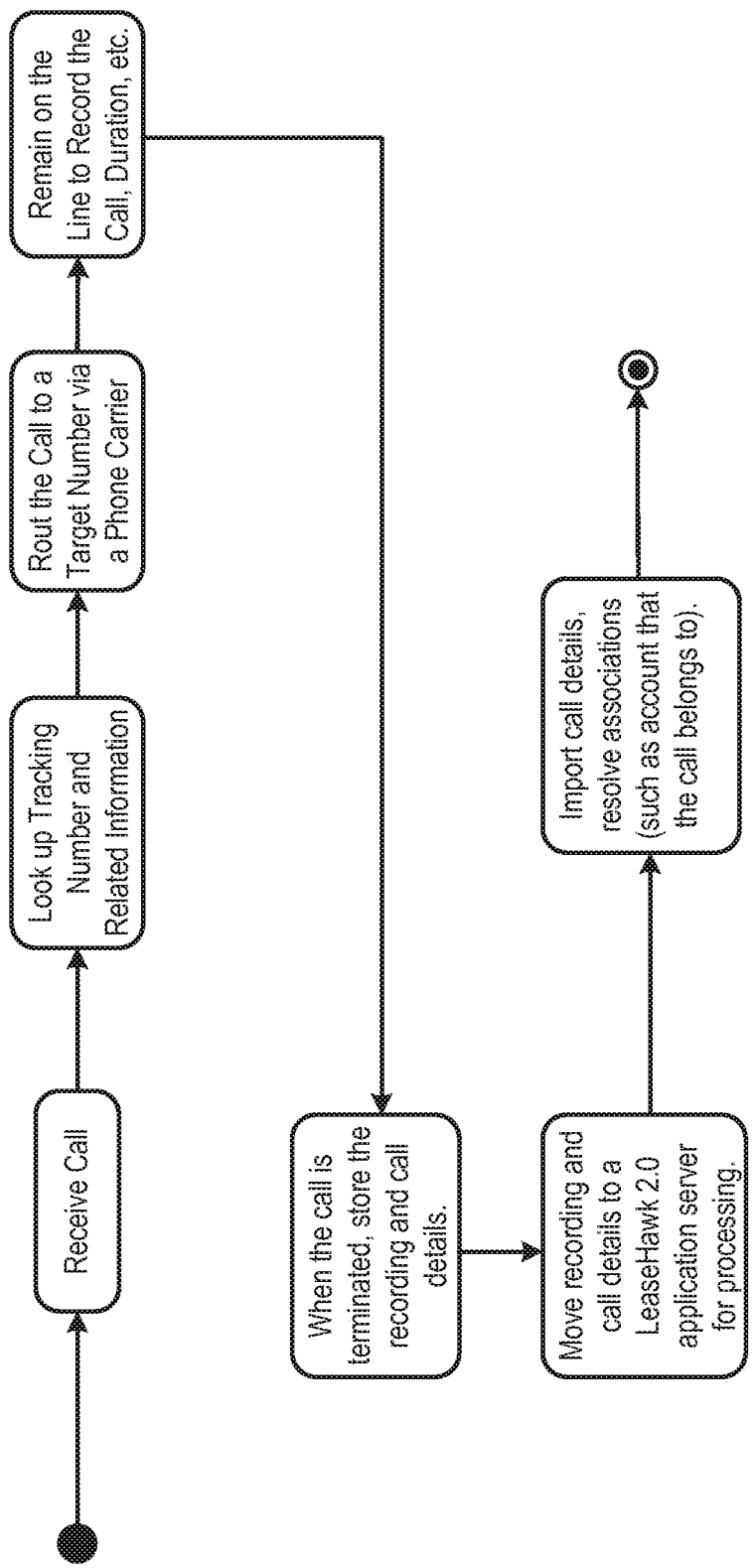
FIG. 3F illustrates a process for management of telephonic communications in an exemplary relationship management system in accordance with an exemplary embodiment.

Turning now to FIG. 2, in various exemplary embodiments, system 100 may comprise a relationship management engine 120, buckets 130, a workflow engine 140, and user interface 160 on some sort of display screen, such as on a smartphone or tablet. Relationship management engine 120 may receive and organize any type of communications 110 and may place communications 110 in buckets 130, for example, based on predetermined criteria set by a user. Workflow engine 140 may determine actions 150 taken by the system 100 in response to certain types of communications, for example based on the business rules determined by the user. It should be appreciated that the types of communications labeled 110 in FIG. 2 are examples, and system 100's capabilities for organizing communications should not be limited to those listed in the figures. Also, the term "phone call" is meant to include video calls and/or voice calls, IP telephony, and/or the like.

In various exemplary embodiments, relationship management engine 120 may be any engine, system, or method within system 100 configured to receive communications from any available source, organize it by placing it into categorical buckets 130, and save the communications. Through relationship management engine 120, the user of system 100 may be able to easily search, retrieve, edit, and/or add notes to any type of communications. It should be appreciated that the functions of relationship management engine 120 are not limited to those listed above, but that those are simply examples of its functionality.

Relationship management engine 120 may receive communications from multiple sources by parsing incoming emails to have a uniform format, for example. Depending on the type of incoming communications, there may be different ways the system 100 and relationship management engine 120 receive and process inputs. For example, all phone calls may be routed to the system 100's telephony systems and all emails are forwarded to specific email accounts associated to the system 100 user.

Figure 4C:
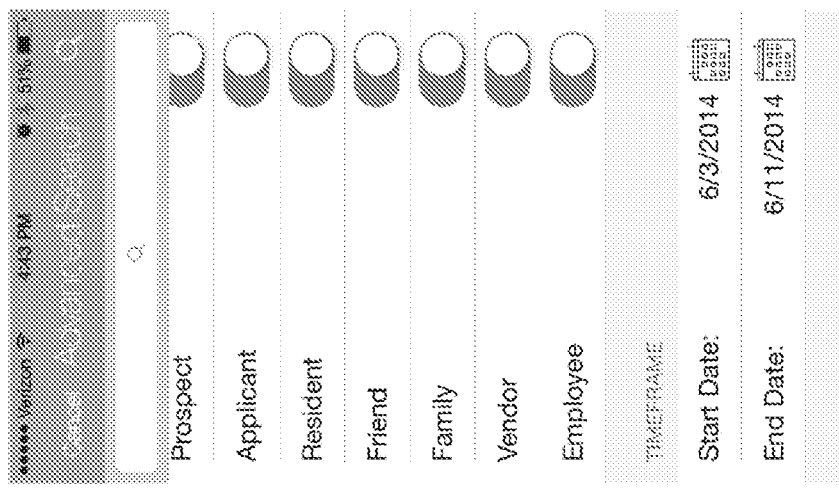
FIGS. 4A through 4R are screenshots illustrating functionality and/or configuration of a user interface component (mobile application) of an exemplary relationship management system in accordance with an exemplary embodiment.
Figure 4B:
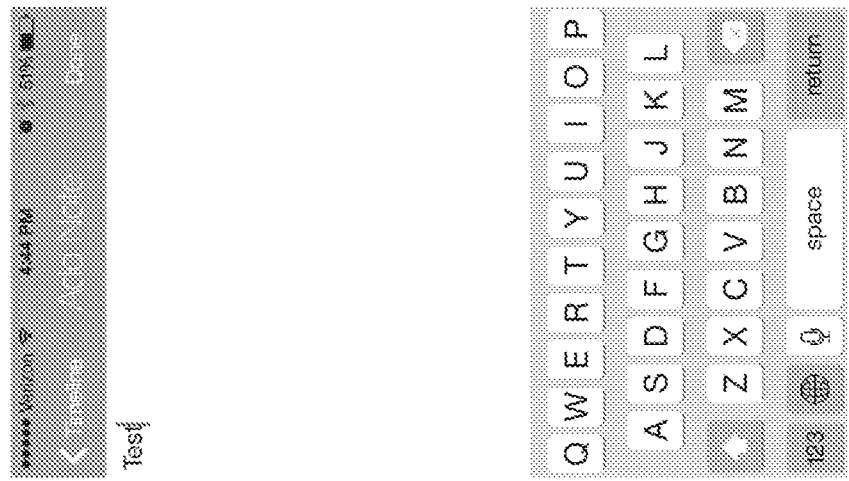
Figure 4A:
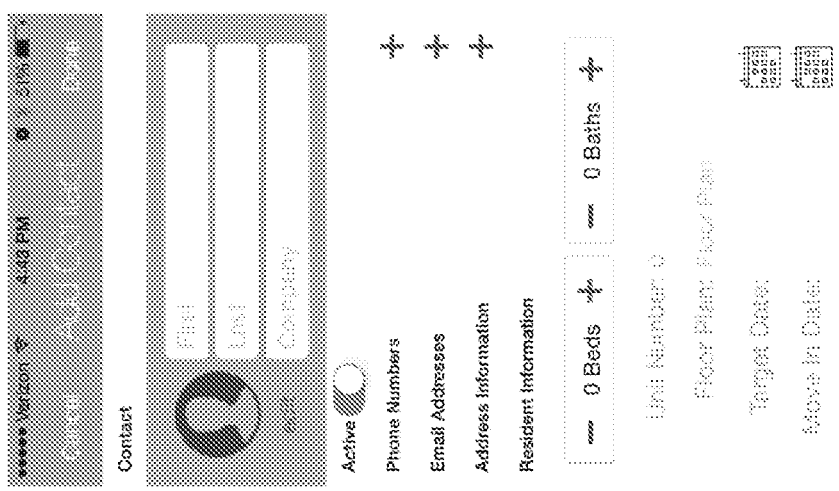
Figure 4F:
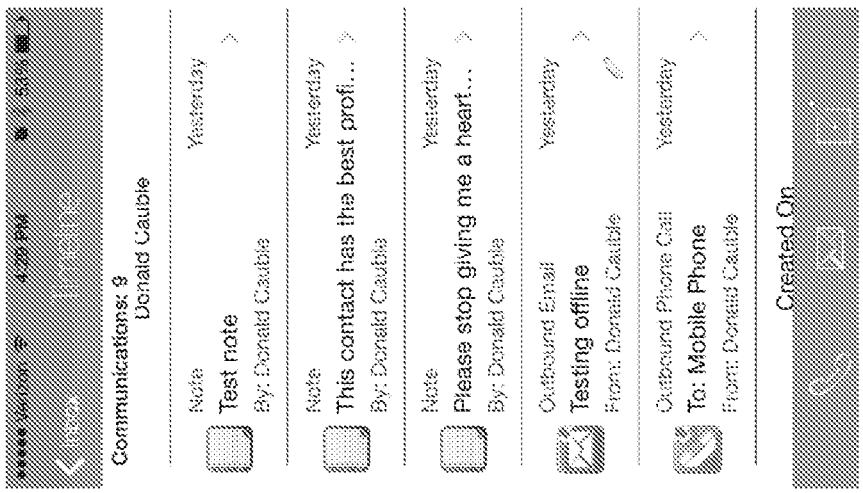
Figure 4E:
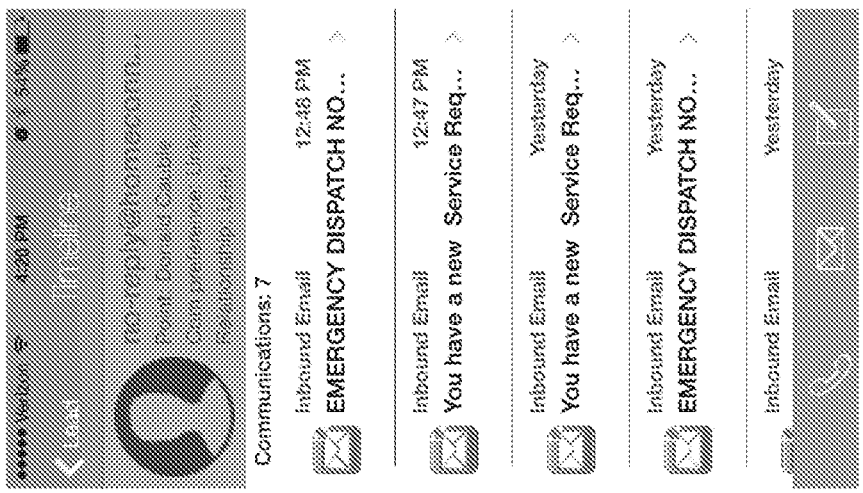
Figure 4D:
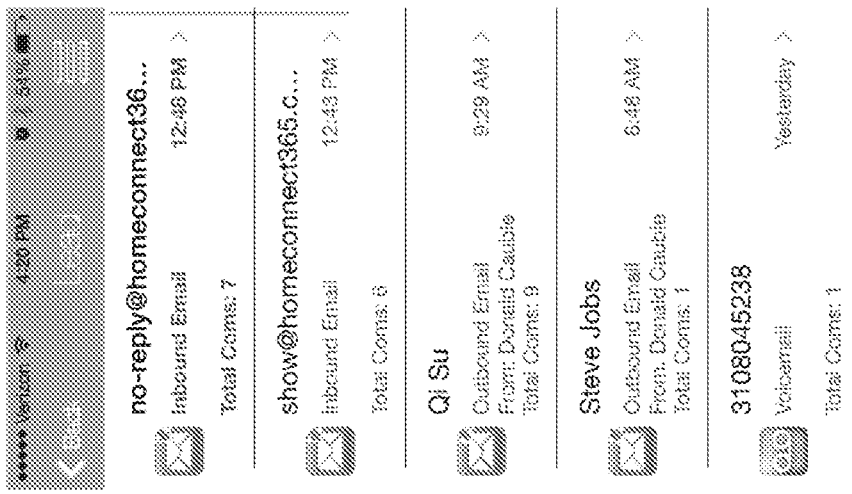
Figure 4I:
Figure 4H:
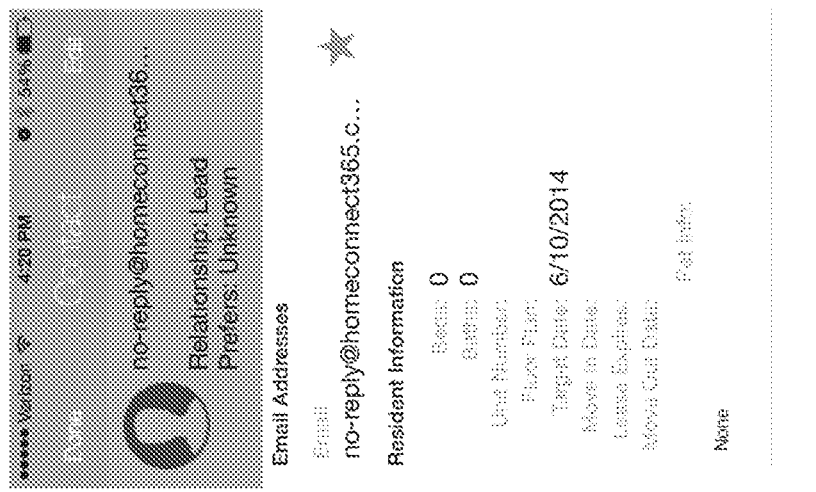
Figure 4G:
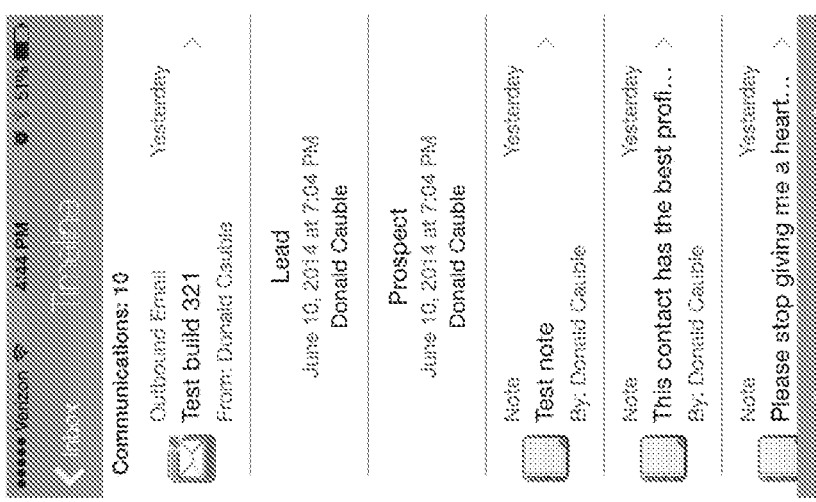
Figure 4L:
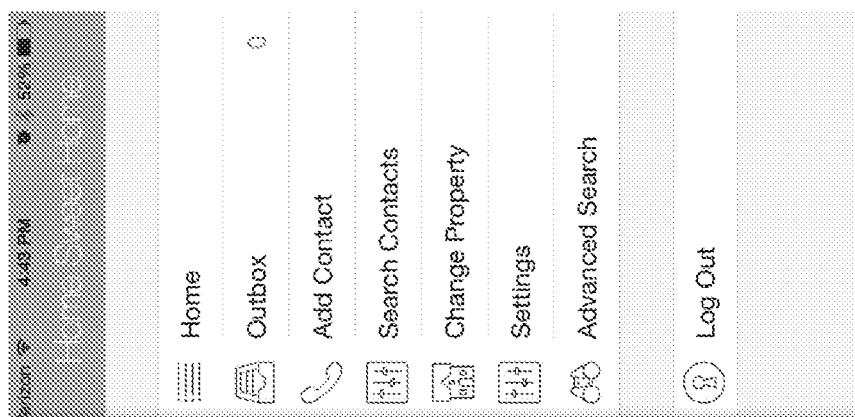
Figure 4K:
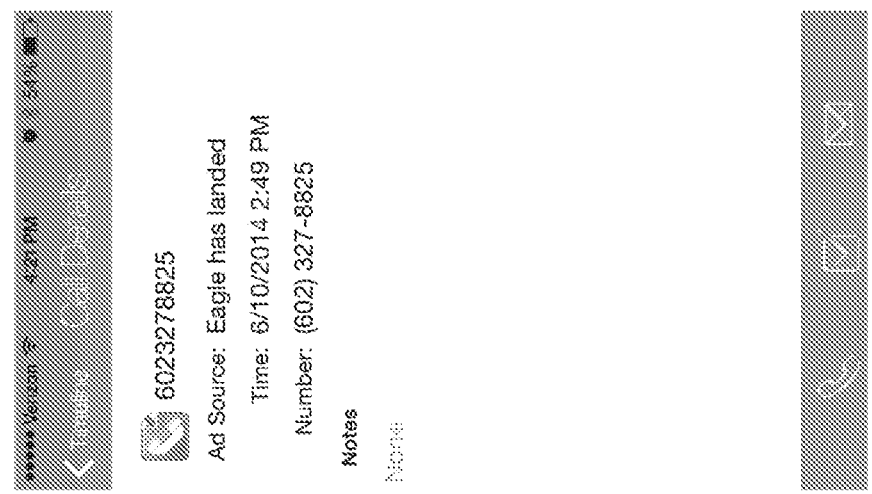
Figure 4J:
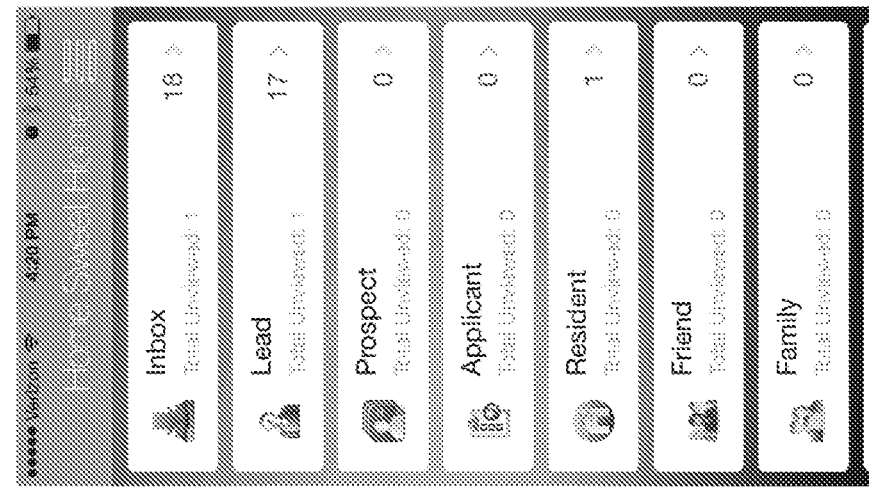
Figures 4M, 4N, 4O:
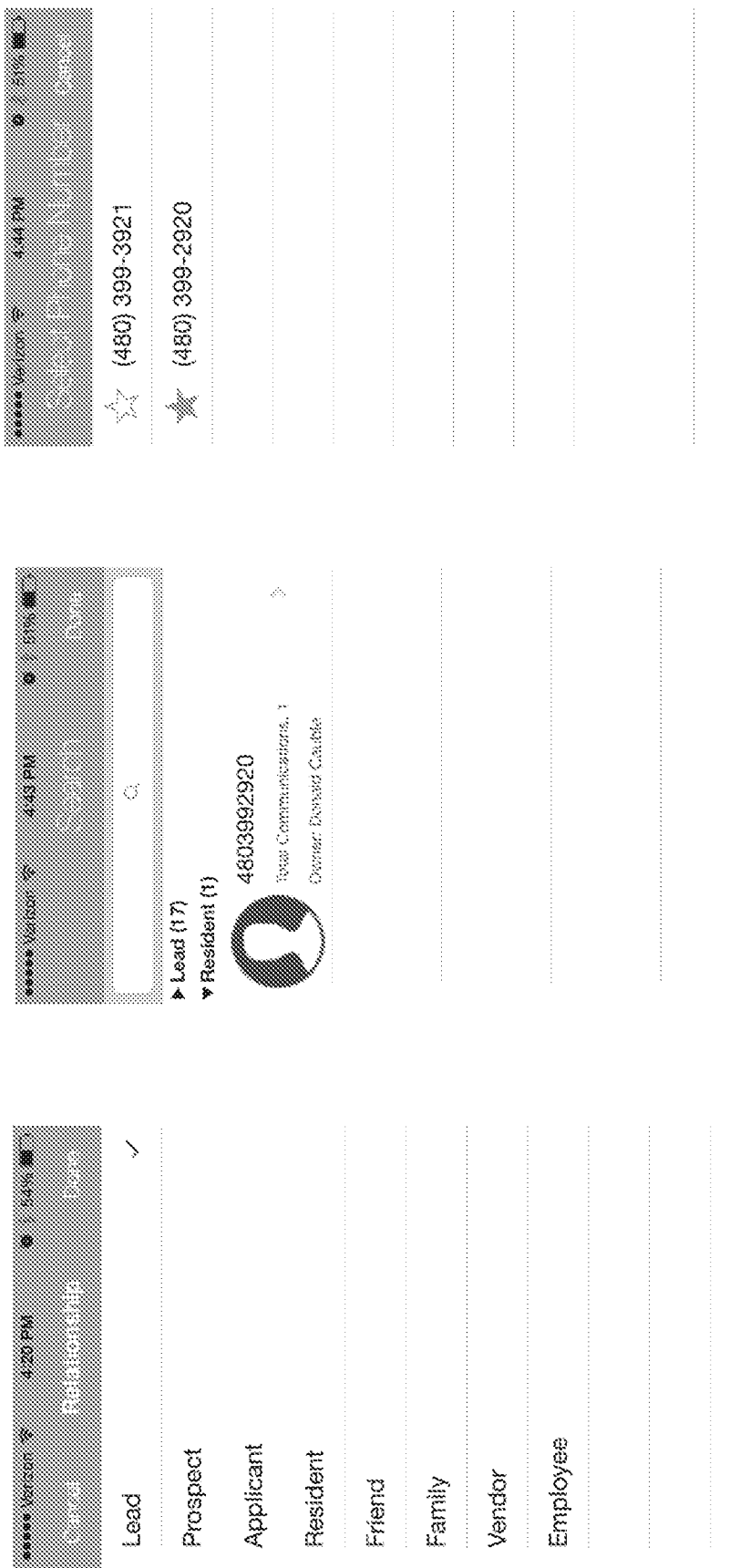

Relationship management engine 120 may organize communications received from multiple sources by placing the communications into categorical buckets 130. A user of system 100 may set relationship management engine 120 to recognize certain characteristics to identify which bucket 130 in which to place the communications. For example, the user may set the relationship management engine 120 to recognize and identify certain phone numbers, email addresses, social media accounts, etc. and place the recognized communications into buckets 130 based on the relationship the system 100 user has with the contact sending the communications. Once the contact is identified by the identifying characteristic(s) of the communications, the communications are placed in the appropriate contact and bucket. For example, a contact may have a relationship status to the user of system 100 of a family member, friend, business associate, potential client, etc., and the user may create buckets 130 for each of those relationship statuses. An example of such buckets is illustrated in FIG. 4J.

If communications are received from an unknown source, the system 100 may try to identify the communications as a different source from an existing contact and merge that communication with other communications from that contact, or receive the communications and indicate to the system 100 user through the user interface that the contact is unknown. If multiple contacts are created for multiple sources of communications, and it turns out that all of the communications are coming from the same person or entity, the user may merge these multiple contacts into one contact folder. In other words, in the event that multiple pieces of communications come in under different emails or phone numbers, the user may manually merge the contacts. Similarly, a system 100 user may be able to transfer a contact's information to another user's system, and when doing so, the transferring user may be prompted to add a note to inform the other user of the contact's information and the reason for the information transfer.

Within each bucket 130, there may be contact folders for each contact, in which communications from all sources coming from that contact may be stored. FIG. 4D, for example, shows a display of contact folders from which to choose and view communications from a certain contact. A system 100 user may also make notes about the inbound or outbound communications and/or the relationship with that contact and store them in the contact folder for that contact. For example, FIG. 4F illustrates a contact folder for communications from a particular contact in which there are notes as well as a display of inbound and outgoing calls. Multiple phone numbers or other communications reception locations for a contact may be organized within a contact folder. The communications type and location (email address or phone number, for example) may be listed, for example in order of preference by the system 100 user. Notes may also be made in any bucket 130 or other folder within system 100.

Accordingly, all communications may be tracked and shown on a timeline as a summary of the system 100 user's communication relationship with that contact. If system 100 user wishes, he can set certain types of communications as priority to be shown first, whether it be communications from a certain person or entity and/or a certain type of communications from a person or entity. The system 100 may also prioritize inbound communications so that the system 100 user acknowledges and answers the most important communications first. This function may be accomplished by the system 100 user pre-determining what contact and/or type of relationship should receive priority. The system 100 may then prioritize the new communications accordingly. If the system 100 user's relationship status with a contact changes or ends, (if their business dealings end, for example) the user may have the ability to make a note of what happened and why the status with that contact has changed.

Communications are safely stored within system 100 and access is password protected. The system 100 user may allow others to have access to the system information on their own device (smartphone, tablet, etc.) by giving the other people access. The degree of access for the other people may be determined by the user, whether the access level be high, like that of an administrator (allowing edits to communications and/or information) or low, like that of a viewer (can only see the communications and/or information in the system 100). The degree of access of another person to a system 100 user's information may be determined by the user. Once communications and information is safely stored in the data cloud, the system 100 user may archive and easily retrieve the information and/or search for key words within a bucket 130 or contact folder to easily locate the desired communications. As an illustration, recorded phone calls may be transcribed, and therefore, may be searchable via the system's 100 search function. Through the search function, all forms of communications stored within system 100 are searchable within system 100. Also, displays before entering a bucket 130 or contact folder may show how many unviewed messages or other types of communications exist in that bucket or contact folder (see FIG. 3), and relationship management engine 120 may be responsible for detecting such unviewed communications.

In addition to the foregoing, relationship management engine 120 may have other functions related to the reception, storage, organization, and prioritization of communications received from any source. For example, relationship management engine 120 may automatically record phone calls as they are taking place based on the system 100 user's settings for that particular contact, or distribute inbound phone calls to multiple mobile phones that may also have system 100 running at that time. Using geo-fencing, system 100 may be configured not to send a call to any system 100 user who may be too far away from a centralized location, or other location determined by a system 100 user. Also, if the system 100 user is placing a call to a certain contact, the user can set the relationship management engine 120 to mask the outbound phone number. This function may also mask any other source-identifying information in any type of outbound communications. This may be accomplished by configuring system 100 to set the masking value for an outbound phone number, email address, or any other source-identifying characteristic of any type of communications. System 100 will then use that configuration value to use for contact identification for incoming communications and/or for sending outbound communications.

With continued reference to FIG. 2, in various exemplary embodiments, work flow engine 140 is any engine, system, or method within system 100 configured to analyze, take action upon, and/or display communications and information received by the relationship management system 100. It should be appreciated that the functions performed by relationship management engine 120 and work flow engine 140 may be performed in conjunction by a single component or system. Additionally, functionality of relationship management engine 120 and/or workflow engine 140 may be supplemented by and/or implemented as inputs or configurations being set and/or performed manually by a system 100 user. Once communications are organized and stored into its appropriate bucket(s) 130, workflow engine 140 may analyze what action should be taken regarding each piece of communications. Work flow engine 140 may look at system parameters, a contact's status, and/or time elapsed to perform certain actions to prompt the user to do something or automatically take appropriate action as configured. For example, the application may send an email reminder or text message to a user about an appointment. A system 100 user may make settings in the workflow engine 140 to govern operation thereof. For example, by utilizing system 100's administrative function, a system 100 user may create settings and set-up pre-determined courses of action in the case(s) of communications having certain characteristics (i.e., contact source, communications type, age of communications, etc.).

For example, for emails received from certain contacts that contain certain content, the system 100 user may set the workflow engine 140 to automatically reply with form emails. Workflow engine 140 may also be set to send communications automatically to certain contacts or all contacts within a bucket 130. For example, if the system 100 user is managing a multifamily housing complex, on the first of each month, the workflow engine 140 may be set to automatically email or text, for example, all contacts in a "tenants" bucket on the last day of each month. As another example, every contact in a "Lead" or "Prospective Client" bucket may automatically be sent communications notifying them of upcoming or present sales for the system 100 user's business.

Workflow engine 140 may also display reminders to the system 100 user if a certain type of communications or communications from a certain contact or contact type is not viewed or answered in a timely fashion. Workflow engine 140 may also move communications to other buckets based on the communications and/or the contact's status or whether the system 100 user has viewed or answered the communications. Communications may remain within the same contact folder, and a contact folder may move between buckets 130.

A system 100 user may be able to set the appropriate amount of response time based on the contact and/or communications types. Similarly, if the system 100 user has not responded in the set amount of time, the workflow engine 140 may be set by the system 100 user to transfer or share the communications to a second system 100 user's communication device (smartphone, tablet, etc.), so that second user may be able to respond to the contact's communications. The second user may then be notified via email or text message, for example, to take action. Also, one system 100 user may transfer an ongoing phone call, route an incoming call to a second system 100 user, or set the system 100 so that incoming communications will be automatically routed to a second system 100 user through the system 100. When a phone call is transferred, the recording of the call may continue on the second user's device (smartphone, tablet, etc.). Since all information is stored on the system 100 data cloud, any user within system 100 may access any recording on their electronic device (smartphone, tablet, etc.).

Workflow engine 140 may automatically schedule tasks set by the system 100 user, such as tasks that must be performed periodically. Similarly, workflow engine 140 may automatically place tasks on the system 100 user's calendar by identifying event names and associated times in received communications. System 100 will display possible calendar events to the user, the user may accept the event, and then the event is added to the calendar. If a system 100 user updates his calendar, sends an email from a different device than the smartphone or tablet with the system 100, or if there are relevant informational updates detected on the Internet or from other system 100 users, the system 100 will periodically sync all accessible data onto the system 100 in order to keep the information displayed by the system 100 in accordance with updates from all accessible sources.

Figures 4P, 4Q, 4R:
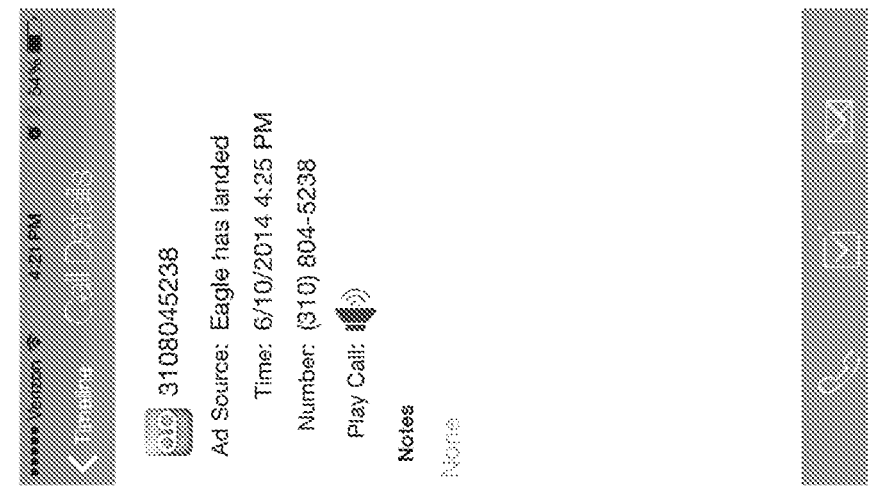
Figure 5B:
FIGS. 5A through 5P are screenshots illustrating functionality and/or configuration of a user interface component (mobile application) of an exemplary relationship management system in accordance with an exemplary embodiment.
Figure 5A:
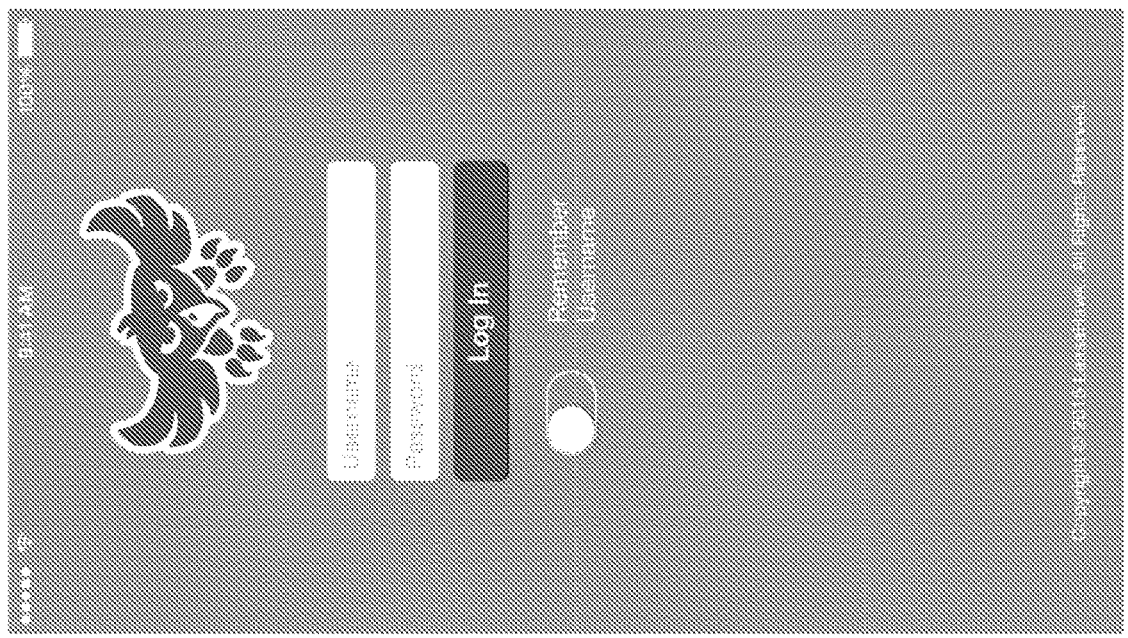
Figure 5D:
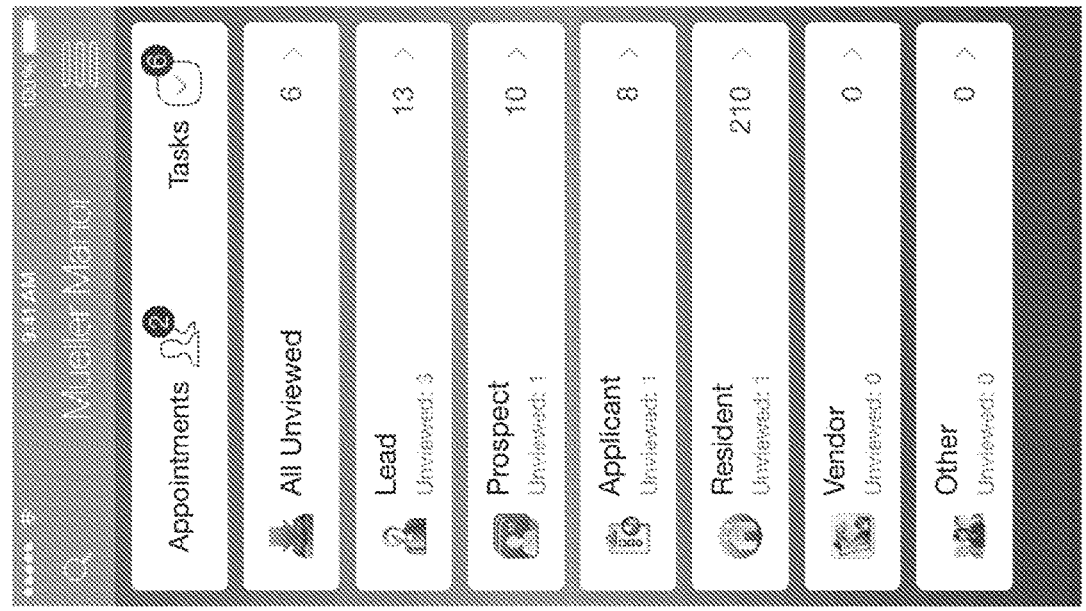
Figure 5C:
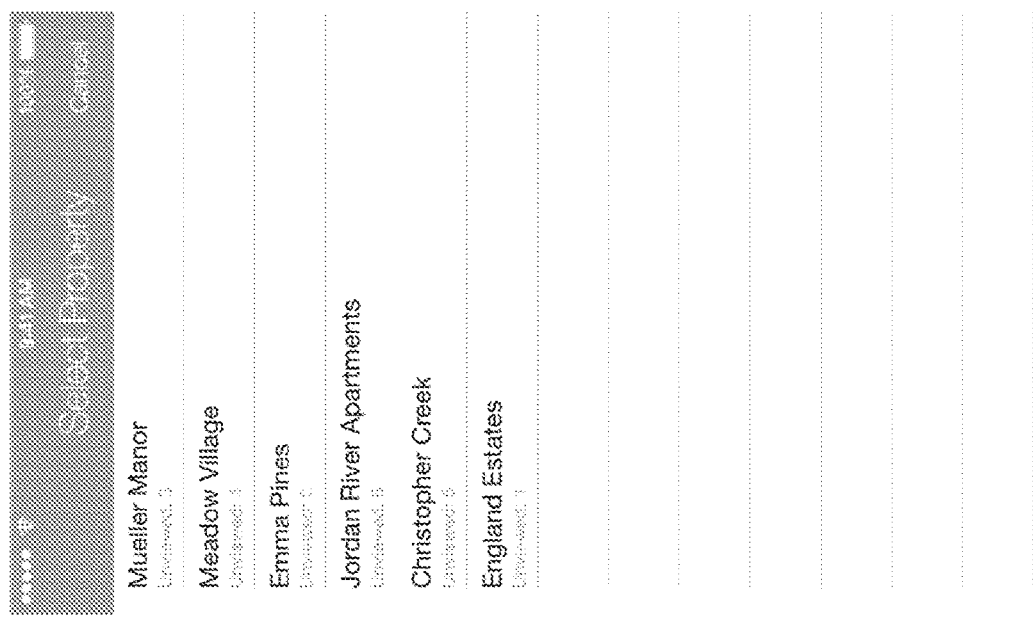
Figure 5H:
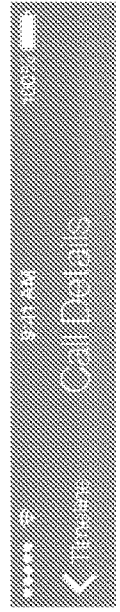
Figure 5H:
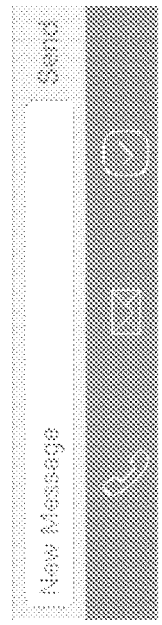
Figure 5G:
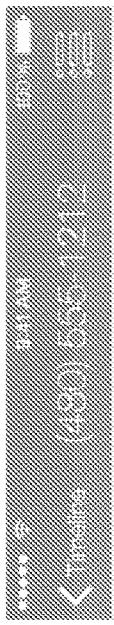
Figure 5I:
Figure 5J:
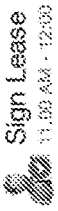
Figure 5N:
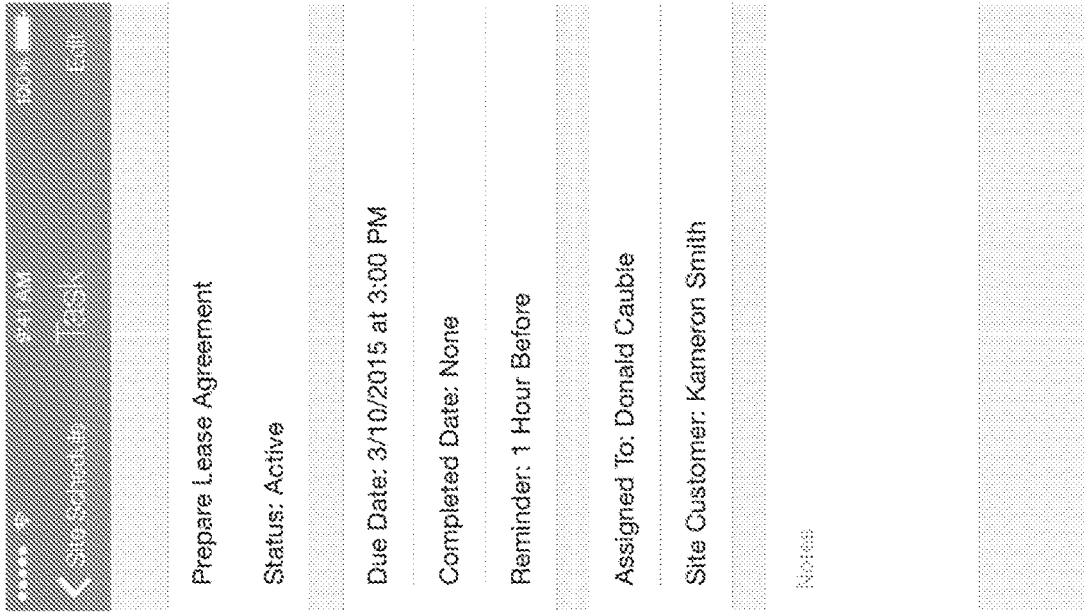
Figure 5M:
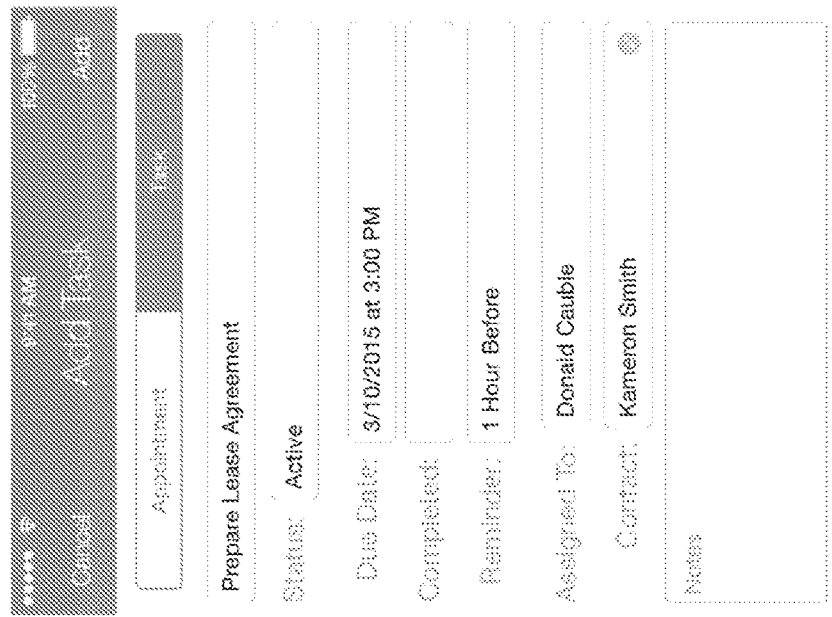
Figure 5P:
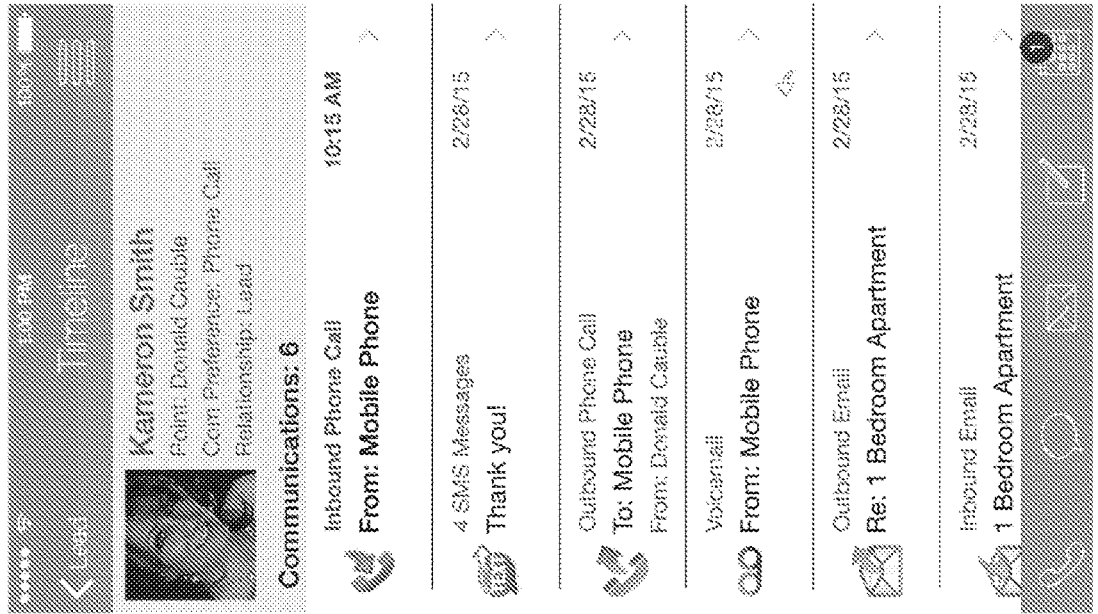
Figure 5O:
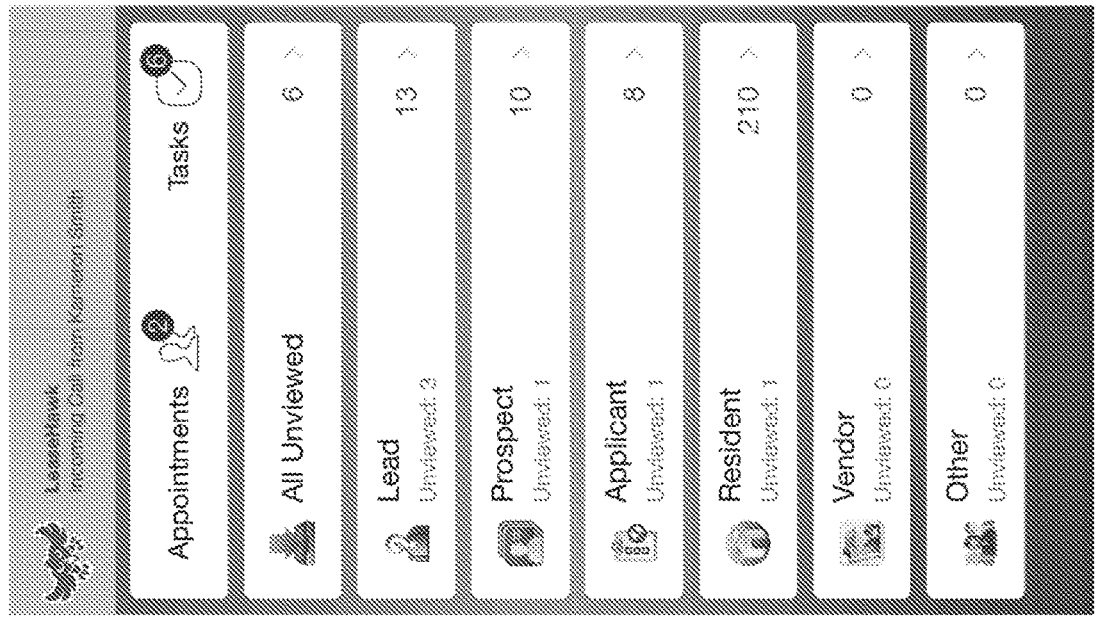

In system 100, interaction with a user may be via user interface 160. User interface 160 may comprise any suitable displays, windows, applications, apps, pop-ups, audio/visual content, and/or the like to allow a user to utilize functionality of system 100. In an exemplary embodiment, user interface 160 comprises a mobile application. In another exemplary embodiment, user interface 160 comprises desktop software. FIGS. 4A-4R illustrate exemplary screenshots of an exemplary user interface 160, illustrating how a user may access functionality of system 100. FIGS. 5A-5P illustrate exemplary screenshots of another exemplary user interface 160, illustrating how a user may access functionality of system 100.

User interface 160 may display any suitable information for a user. For example, the displays may include lists of buckets with contact relationship statuses, contact names, communications types, notes within communications made by the system 100 user, etc. The user interface 160 may also provide email templates created by the system 100 user, as well as graphics that may be loaded onto emails or other forms of communications. These templates and graphics may be stored in the system 100, along with all other communications and information. Through these displays on the user interface 160, the user may navigate the communications and information stored within the system 100 or create communications, for example by searching key words, navigating through buckets and contact lists, looking at calendar schedules or business reports, or any number of appropriate actions. A system 100 user may save, delete, archive, prioritize, move, copy, transfer to another system 100 user, or perform any other suitable action to (or with) communications information associated with system 100.

Turning now to FIGS. 3A through 3F, in various exemplary embodiments a system 100 may be configured with components, methods, and data flows as illustrated.

While examples may have been used above or shown in the figures regarding the relationship management system's applicability to certain industries, those examples herein should not be read to limit the present disclosure to such industries. Principles of the present disclosure may suitably be applied in connection with relationship management in various industries and/or contexts.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that applicable interfaces may include mobile devices, kiosks and handheld devices such as mobile phones, smartphones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method comprising:
    masking, by a processor, source-identifying information of an outbound communication with a masking value;
    sending, by the processor, the outbound communication with the masking value to a known contact;
    receiving, by the processor and from the known contact, an incoming communication comprising the masking value;
    determining, by the processor, that the incoming communication is from the known contact, based on the incoming communication including the masking value;
    filtering, by the processor, the incoming communication into a bucket from a plurality of buckets using the masking value for contact identification;
    identifying, by the processor, a contact in the incoming communication based on the masking value;
    associating, by the processor, the incoming communication with the masking value; and
    recording, by the server, the incoming communication under a source contact section associated with the source contact that sent the incoming communication;
    receiving, by the processor, an unknown communication;
    determining, by the processor, that the unknown communication is from an unknown contact, based on the unknown communication lacking the masking value; and
    recording, by the processor, the unknown communication into a second file associated with the unknown contact.

2. The method of claim 1, wherein the source-identifying information includes an outbound number.

3. The method of claim 1, further comprising associating, by the processor, the masking value with a known contact.

4. The method of claim 1, wherein the masking value is associated with the outbound communication.

5. The method of claim 1, further comprising organizing, by the processor, at least one of the incoming communication or the unknown communication by communication type, wherein the communication type includes at least one of an email, a text message, social media communication, telephone call, manual entry or a voice call from a computing device.

6. The method of claim 1, wherein the incoming communication includes content characteristics having at least one of phone number, email address, social media account, or relationship between the known contact and a user of a first user system.

7. The method of claim 1, wherein all communications from the known contact are displayed together in the source contact section.

8. The method of claim 1, further comprising:
receiving, by the processor, a priority preference based on a type of communication and the known contact; and
displaying, by the processor, the incoming communication based on the priority preference.

9. The method of claim 1, further comprising:
receiving, by the processor, notes associated with the incoming communication, wherein the notes include a reason for transferring the known contact to a second user system;
incorporating, by the processor, the notes into the incoming communication; and
transferring, by the processor, the known contact to the second user system.

10. The method of claim 1, further comprising:
analyzing, by the processor, the incoming communication to identify an action to take in response to the incoming communication, wherein the action comprises creating a calendar event; and
identifying, by the processor, an event name and an event time of the calendar event in the incoming communication.

11. The method of claim 10, further comprising presenting, by the processor, the calendar event for verification.

12. The method of claim 1, further comprising restricting a call from being sent to the known contact, in response to the known contact being outside of a geo-fence area.

13. The method of claim 1, further comprising displaying, by the processor, the incoming communication in a timeline with other communications from the known contact.

14. The method of claim 1, wherein the incoming communication is associated with management of tenants in a multi-family housing complex.

15. The method of claim 1, further comprising:
analyzing, by the processor, the incoming communication; and
selecting, by the processor and based on the analyzing, an action from among a plurality of actions.

16. The method of claim 15, wherein the analyzing is based on at least one of system parameters, a status of the known contact, or a time elapsed.

17. The method of claim 15, wherein the plurality of actions comprises at least one of automatically replying to an email, moving the incoming communication from the source contact section into a third file or transferring a telephone call from a first mobile device to a second mobile device.

18. The method of claim 1, further comprising facilitating, by the processor, at least one of sending notifications, scheduling tasks, or displaying reports.

19. The method of claim 1, further comprising filtering, by the processor, at least one of the incoming communication or the unknown communication based on at least one of a communication type, the known contact, business rules, content characteristics or user settings.

20. A system comprising:
a processor;
a tangible, non-transitory memory configured to communicate with the processor,
the tangible, non-transitory memory having instructions stored thereon that, in response to execution by the processor, cause the processor to perform operations comprising:
masking, by the processor, source-identifying information of an outbound communication with a masking value;
sending, by the processor, the outbound communication with the masking value to a known contact;
receiving, by the processor and from the known contact, an incoming communication comprising the masking value;
determining, by the processor, that the incoming communication is from the known contact, based on the incoming communication including the masking value;
filtering, by the processor, the incoming communication into a bucket from a plurality of buckets using the masking value for contact identification;
identifying, by the processor, a contact in the incoming communication based on the masking value;
associating, by the processor, the incoming communication with the masking value; and
recording, by the server, the incoming communication under a source contact section associated with the source contact that sent the incoming communication;
receiving, by the processor, an unknown communication;
determining, by the processor, that the unknown communication is from an unknown contact, based on the unknown communication lacking the masking value; and
recording, by the processor, the unknown communication into a second file associated with the unknown contact.

* * * * *